United States Patent [19]
Swirbel et al.

[11] Patent Number: 5,529,863
[45] Date of Patent: Jun. 25, 1996

[54] METHOD FOR FABRICATING LCD SUBSTRATES HAVING SOLDERABLE DIE ATTACH PADS

[75] Inventors: Thomas J. Swirbel, Davie; John K. Arledge, Ft. Lauderdale, both of Fla.

[73] Assignee: Motorola, Inc., Schaumburg, Ill.

[21] Appl. No.: 503,141

[22] Filed: Jul. 17, 1995

Related U.S. Application Data

[63] Continuation-in-part of Ser. No. 283,423, Aug. 1, 1994, abandoned.

[51] Int. Cl.⁶ .................................................. C09K 19/00
[52] U.S. Cl. ........................ 430/20; 430/314; 430/319; 427/109; 427/126.2; 427/126.3; 359/72; 359/74; 359/75; 359/76
[58] Field of Search .............................. 430/20, 313, 314, 430/315, 319, 321; 427/109, 126.2, 126.3; 359/62, 72, 74, 75, 76; 156/659.1; 29/592.1

[56] References Cited

U.S. PATENT DOCUMENTS

| | | | |
|---|---|---|---|
| 4,188,095 | 2/1980 | Nishimura et al. | 350/357 |
| 4,643,526 | 2/1987 | Watanabe et al. | 350/332 |
| 4,917,466 | 4/1990 | Nakamura et al. | 350/336 |
| 5,169,737 | 12/1992 | Haws | 430/20 |
| 5,338,240 | 8/1994 | Kim | 430/20 |

*Primary Examiner*—Charles L. Bowers, Jr.
*Assistant Examiner*—Christopher G. Young
*Attorney, Agent, or Firm*—Dale W. Dorinski

[57] ABSTRACT

A method for fabricating solderable pads (106) onto a glass substrate (101) includes the step of depositing a seed metallization layer (step 406) after the polyimide layer is cured (step 404) but prior to buffing the alignment layer (step 414). The seed metallization layer can done by, for example, sputter depositing indium-tin, tin or copper.

9 Claims, 3 Drawing Sheets

METHOD FOR FABRICATING LCD SUBSTRATES HAVING SOLDERABLE DIE ATTACH PADS

CROSS REFERENCE TO RELATED APPLICATIONS

This application is a continuation-in-part of U.S. application Ser. No. 08/283,423, filed Aug. 1, 1994, now abandoned, by Swirbel, et al., and assigned to Motorola, Inc.

TECHNICAL FIELD

This invention relates in general to liquid crystal displays (LCDs) and more specifically to a method of fabricating a LCD.

BACKGROUND

In order to shrink the package size of an LCD module, it is often desirable to mount the LCD integrated circuit (IC) driver directly to one of the glass substrates used to fabricate the LCD display. Wire bond or flip chip methods may be used to attach the IC die on to the glass substrate, with the flip chip technique being typically preferred because it requires less space. When wire bonds are used, additional area and volume is needed for both the wire bonds and either the lid enclosure or the polymeric glob top encapsulant material. Flip chip attachment requires that a suitable bond be formed between the integrated circuit (IC) pad metallization and the substrate metallization. For flip chip applications, the IC bond pads are either gold plated or tin-lead bumped using a well known controlled collapse chip connection (C4) process. Examples of direct chip bonding to the glass substrate are demonstrated in U.S. Pat. Nos. 4,643,526 and 4,917,466, incorporated herein by reference.

It would be advantageous if one could bond directly to the transparent indium tin oxide (ITO) used for the display electrodes, however, most present bonding techniques such as thermo-compression do not provide sufficient adhesion for providing reliable joints. It is usually necessary to selectively add subsequent metal layers such as nickel/gold over the ITO through additive vacuum deposition and follow this by plating steps to achieve a bondable surface. Presently, this can only be accomplished through time consuming and repetitive photolithography operations to metallize the desired areas at a significant expense.

Alternatively, significant effort has been spent trying to attach IC's directly to the ITO metallization pattern using conductive epoxies and anisotropic conductive films. While these methods have merit, they do have limitations, especially as package densities increase and conductor lines are routed between bond pads, leaving geometries on the order of 0.0254 millimeter (0.001 inch) or less. A need thus exists in the art for a method for forming metallic pad areas on a substrate during array fabrication which, if desired, may be overplated prior to polarizer attach to provide high resolution bond sites for "chip on glass" applications.

DETAILED DESCRIPTION OF THE PREFERRED EMBODIMENT

Figure 1:
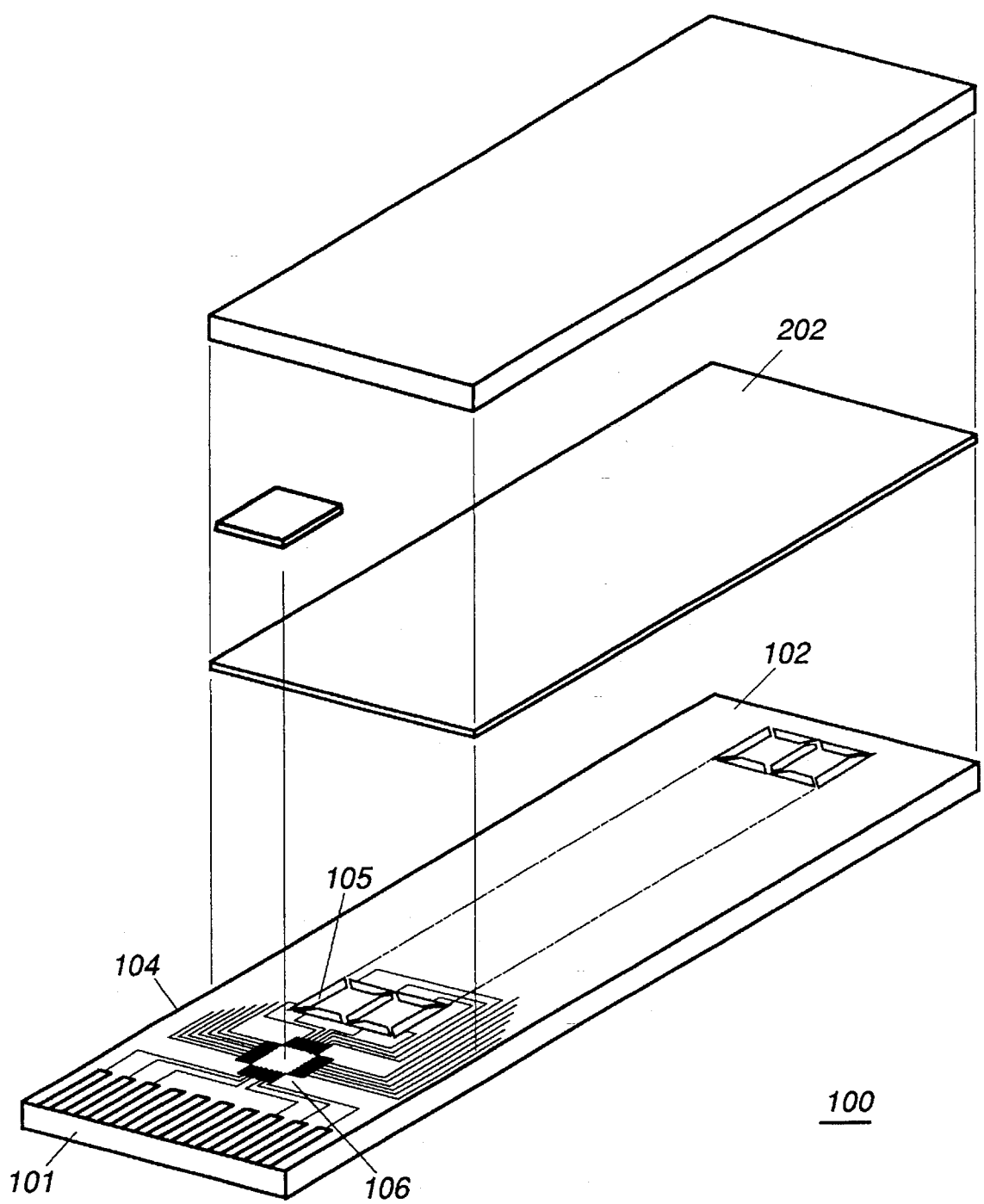
FIG. 1 is an exploded view of a liquid crystal display module in accordance with the present invention.
Figure 2:
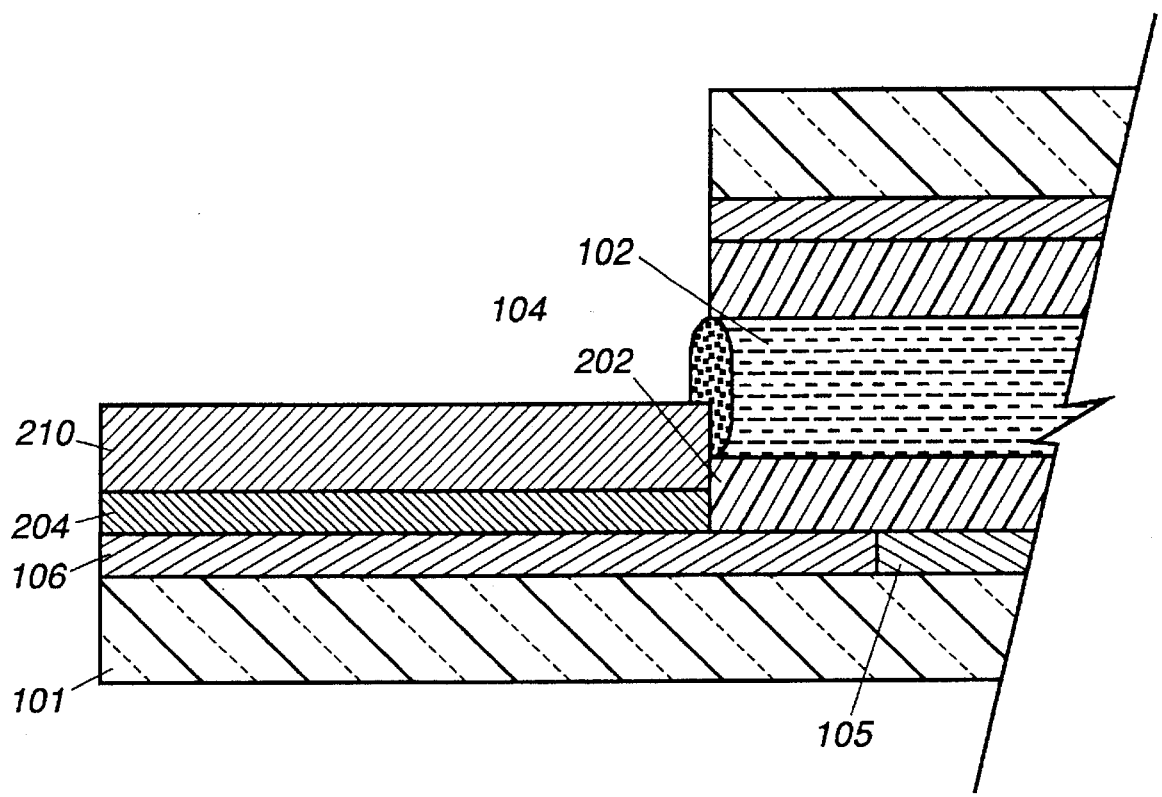
FIG. 2 is a cross-sectional view of the display of FIG. 1 through section '2—2' in accordance with the present invention.
Figure 3:
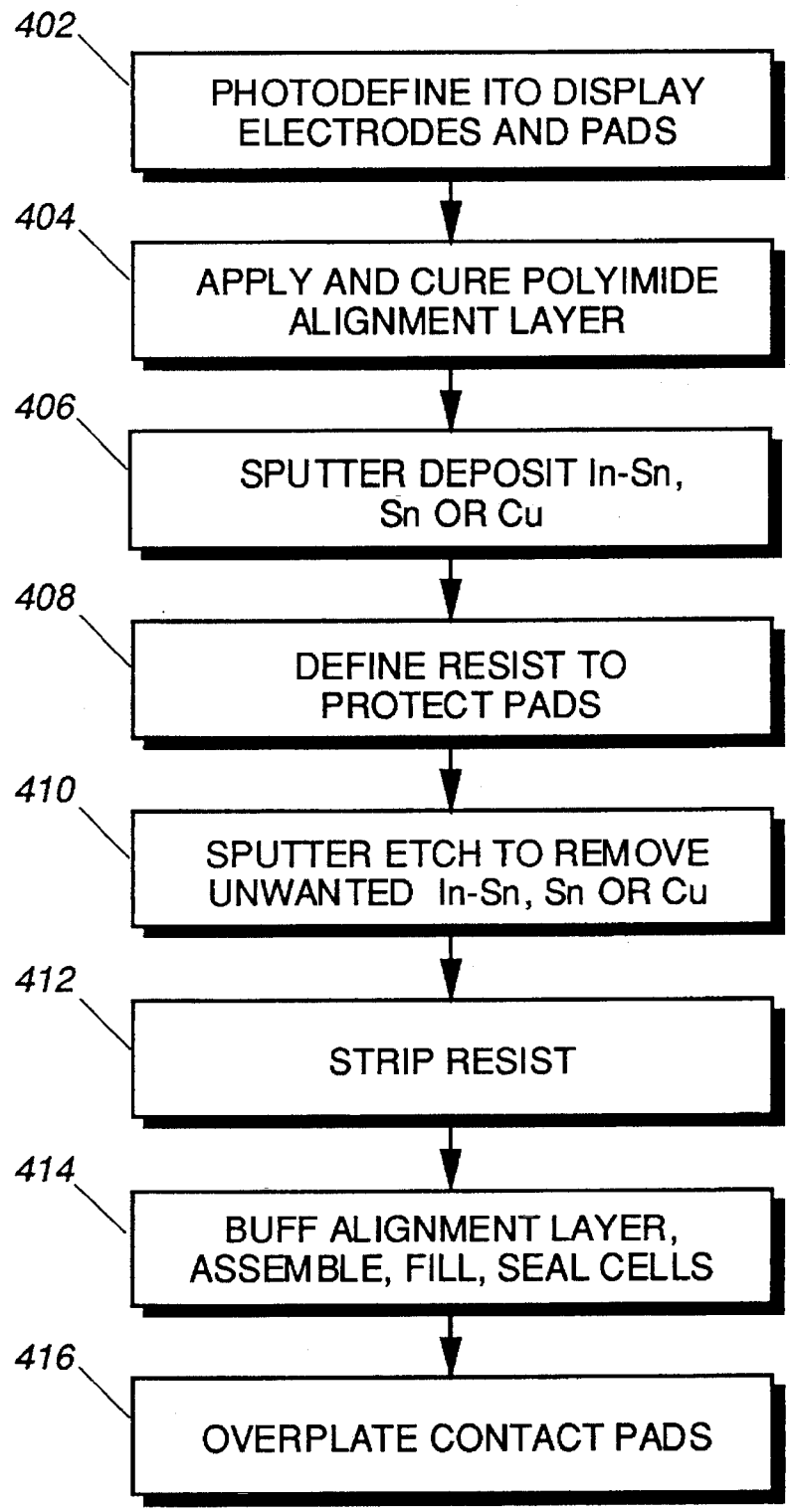
FIG. 3 is a flow chart showing the process for forming the LCD in accordance with the present invention.

Referring now to FIGS. 1–3, there is shown an exploded view and a cross-sectional view of a liquid crystal display module 100, along with a flow chart outlining the steps in the manufacturing process, in accordance with the present invention. Display module 100 includes a transparent substrate 101 having an active display area 102 and a display ledge 104 disposed thereon. The substrate 101 includes bond or attachment pads 106, display electrodes 105 and circuitry metallization (runners) connecting the electrodes and the bond pads. In step 402 of the process, a display substrate with a layer of ITO deposited thereon is provided. The ITO layer has been patterned into a circuitry pattern consisting of the display electrodes 107 and the attachment pads 106. The circuitry pattern is photodefined onto the glass substrate using well-known conventional photodefinition and etching techniques. One example of the photodefinition process as applied to LCD manufacturing may be found in U.S. Pat. No. 4,188,095, incorporated herein by reference. The ITO thickness is typically between 100–2000 Å. Next (step 404) a polyimide alignment layer 202 is applied to only the display portion 102 of the substrate 101. The polyimide alignment layer is typically between 500–1000 Å, and is appropriately dried and cured (for details on application and curing of specific polyimides, consult the polyimide manufacturer's directions). It is important that the polyimide be applied in a manner so as to cover the display electrodes 105, but to leave the attachment pads 106 on the ledge 104 free and uncovered. The next step (406) is to apply a layer 204 of metallic or partially oxidized indium-tin (In—Sn), tin, chromium or copper on the order of 1000 Å over the entire glass substrate 101 to form a 'seed' metallization layer. The purpose of this layer is to provide a metal system on the bonding pads that will be amenable to later plating operations. One preferred method of applying the 'seed' metal layer is to sputter deposit or evaporate it using any number of well known vacuum deposition techniques. At this point, the entire substrate 101 upper surface, including the polyimide layer 202 and the ledge 104, is covered with the 'seed' layer 204.

The attachment pads 106 which require further metallization are then covered with a photoresist in step 408, such as photoresist AZ 4620 manufactured by American Hoechst. This is followed by imaging and developing using standard photolithography techniques. The resist is photoimaged in such a manner so as to cover only the metal attachment pads 106 and associated interconnecting circuitry. Areas of the ledge 104 that do not have metal circuitry on them are meant to be revealed (not covered with resist) for a subsequent etching step. To rephrase, at this point the photoresist only covers the attachment pads 106. Sputter or dry etching is then employed to remove the unwanted portions of the 'seed' layer 204 in step 410. The etching process removes only those portions of the 'seed' layer 204 that are revealed. Those portions covered with photoresist are protected and not affected by the etching process. For example, all portions of the 'seed' layer 204 over the display area are removed to reveal the polyimide layer 202. Those portions of the layer 204 that cover portions of the ledge 104 that do not have attachment pads or other circuitry are also etched clean to reveal the bare substrate. In step 412, all of the remaining photoresist layer is stripped away. No vestiges of the photoresist should remain after this point.

The polyimide alignment layer 202 is then buffed to align the polyimide surface molecules with the liquid crystal molecules. The buffing process is well known, and is used to produce the proper tilt angle in the liquid crystal fluid. The polyimide alignment layer is typically rubbed or buffed with short-nap polyester or cellulose acetate materials either in a static or rotating configuration. The latter may be a simple buffing machine with a paint roller attachment or a more sophisticated machine with controls for buffing wheel speed, roller pressure, and substrate travel. Buffing or rubbing of the film with materials that are higher melting than the film is believed to produce enough localized heating to cause the long-chain polyimide molecules to become oriented with their chains parallel to the buffing (or rubbing) direction. The liquid crystal molecules that come into contact with the oriented film are then aligned in the same direction as the polymer chains. A preferred tilt of the molecules occurs as a result of the interaction of the liquid crystal molecules with the chemical structure of the film. In further assembly steps, the substrate is sawn into individual display segments (if processed in array format), filled with liquid crystal fluid and end sealed in step 414. These process are well known to one skilled in the art, and more detail may be found in the incorporated references. The attachment pads 106 now have a metal overlayer of 'seed' metal 204 that can serve as an adherent layer for additional electroplating (step 416) using edge-type brush plating techniques, electroplating techniques or electroless techniques. The plating step 416 produces another layer of metal 210 on the pads 106 that now provides a good surface for subsequent flip chip bonding of the IC.

In the prior art, the two main difficulties in metallizing bonding pads are: forming selectively metallized areas with a sufficiently thick films without negatively impacting the transparent conductive ITO display conductor areas; and maintaining the metallic or partially oxidized state of the film through display processing, particularly during the high temperature (>200 degree Celsius) polyimide cure. The present invention overcomes these problems by depositing the seed metallization layer after the polyimide layer is cured but prior to buffing (i.e., the step that aligns the PI surface molecules with the liquid crystal molecules). The overlayer is then patterned using standard lithography techniques to expose the metal in the unwanted areas of the substrate and the metal is removed by physical sputter etching.

Physical sputter etching is the preferred method in step 410 for removing the In—Sn or copper from unwanted areas because the etch rate of the 'seed' layer 204 is approximately 2.5 times that of the ITO underlayer. Thus, the etch end point is easily achieved without damaging the display's transparent conductive layer. Additionally, the polyimide overlayer acts as an etch barrier to the underlying ITO film in the active display area. Contrarily, wet etchants such as hydrochloric acid and sulfuric acid/hydrogen peroxide do not provide the required selectivity to etch the overlayer without damaging the transparent conductive underlayer. Additionally, the edge acuity of the etched line is very poor when done chemically, not lending itself to fine pitch applications (e.g., <0.0508 millimeters). Pads defined using the present invention have been successfully fabricated down to a 0.1016 millimeter (0.004 inch) pitch.

In FIG. 2, a cross-sectional view of a display substrate in accordance with the invention is shown. A glass substrate 101 is shown having ITO layers 105, 106 which are overlayered with copper 204, thereby providing a seed metallization layer. On top of this layer is metal plating layer 210, forming a plated conductor having bond pad metallization in accordance with the present invention. The plating layers may comprise copper, nickel, or gold.

In summary, the present invention combines a novel display manufacturing process to form metallic pads which may be used for direct chip attach on LCD substrates. The invention provides for a low cost display package without compromising the integrity of the display electrode metallization. The method can be used to provide a seed metallization or the pads can be overplated.

What is claimed is:

1. A method for providing metallization areas on a liquid crystal display substrate, comprising the steps of:

providing a liquid crystal display substrate having a display electrode pattern and a bonding pad pattern disposed on an upper surface thereof;

applying a polyimide layer on the substrate upper surface in a manner sufficient to cover the display electrode pattern and to reveal the bonding pad pattern;

depositing a seed metallization layer on the substrate so as to cover at least the revealed bonding pad pattern;

covering the seed metallization layer with a photoresist layer such that the photoresist overlies at least the bonding pad pattern and reveals portions of the seed metallization layer immediately adjacent to the bonding pad pattern;

removing any portions of the seed metallization layer which are not covered with the photoresist layer by etching the seed metallization layer; and removing the photoresist layer.

2. A method as defined in claim 1, wherein the seed metallization layer also overlies the polyimide layer.

3. A method as defined in claim 1, further comprising a step, after the step of removing the photoresist layer, of buffing the polyimide layer to provide a preferential orientation in the polyimide layer.

4. A method as defined in claim 1, wherein the depositing step is performed after a further step of curing the polyimide layer.

5. A method as defined in claim 1, wherein the step of depositing the seed metallization layer comprises depositing a material selected from the group consisting of indium, tin, copper, their oxides and combinations thereof.

6. A method as defined in claim 1, further comprising a final step of overplating the bonding pad pattern.

7. A method as defined in claim 6, wherein the bonding pad pattern is overplated using one or more processes selected from the group consisting of brush plating, electroplating and electroless plating.

8. A method as defined in claim 1, wherein the step of removing comprises sputter etching the seed metallization layer.

9. A method for providing metallization areas on a liquid crystal display substrate, comprising the steps off providing a liquid crystal display substrate having a display electrode pattern and a bonding pad pattern disposed on an upper surface thereof;

applying a polyimide layer on the substrate upper surface in a manner sufficient to cover the display electrode pattern and to reveal the bonding pad pattern;

curing the polyimide layer;

depositing a seed metallization layer selected from the group consisting of indium, tin, copper, their oxides and combinations thereof on the substrate so as to cover the polyimide layer and the revealed bonding pad pattern;

covering the seed metallization layer with a photoresist layer such that the photoresist layer overlies at least the bonding pad pattern and reveals those portions of the seed metallization layer immediately adjacent to the bonding pad pattern;

removing any portions of the seed metallization layer which are not covered with the photoresist layer by sputter etching the seed metallization layer;

removing the photoresist layer;

buffing the polyimide layer to provide a preferential orientation on a surface of the polyimide layer; and overplating the bonding pad pattern using one or more processes selected from the group consisting of brush plating, electroplating and electroless plating.

* * * * *